United States Patent
Rosenbaum

(10) Patent No.: US 12,196,351 B2
(45) Date of Patent: Jan. 14, 2025

(54) CABLE MANAGEMENT DEVICE

(71) Applicant: Milspec Enterprises, LLC, Panorama City, CA (US)

(72) Inventor: Yosef Rosenbaum, Los Angeles, CA (US)

(73) Assignee: Milspec Enterprises, LLC, Panorama City, CA (US)

( * ) Notice: Subject to any disclaimer, the term of this patent is extended or adjusted under 35 U.S.C. 154(b) by 73 days.

(21) Appl. No.: 17/748,437

(22) Filed: May 19, 2022

(65) Prior Publication Data

US 2022/0373297 A1    Nov. 24, 2022

Related U.S. Application Data

(60) Provisional application No. 63/191,209, filed on May 20, 2021.

(51) Int. Cl.
   *F16L 3/123*     (2006.01)
   *H02G 3/32*     (2006.01)

(52) U.S. Cl.
   CPC ............... *F16L 3/123* (2013.01); *H02G 3/32* (2013.01)

(58) Field of Classification Search
   CPC .... H02G 1/14; H02G 3/32; H02G 3/30; F16L 3/04; F16L 3/123; F16L 3/06; F16L 3/10; F16L 3/1058; Y10T 24/3936; Y10T 24/3958; Y10T 24/3967; F41C 27/00; F41C 23/16; H01R 4/646; H01R 4/34; H01R 4/44
   USPC .............................. 248/49, 71, 73, 74.2, 68.1
   See application file for complete search history.

(56) References Cited

U.S. PATENT DOCUMENTS

| | | | | |
|---|---|---|---|---|
| 812,287 | A * | 2/1906 | Nagel | H01R 4/44 24/135 R |
| 888,313 | A * | 5/1908 | Cook | F16G 11/06 24/135 L |
| 1,789,502 | A * | 1/1931 | Stewart | H01R 4/38 439/781 |
| 1,979,091 | A * | 10/1934 | Alsaker | H01R 4/44 411/533 |
| 2,058,558 | A * | 10/1936 | Bovard | H02G 7/053 24/135 A |
| 2,306,497 | A * | 12/1942 | Pieper | H01R 4/44 439/783 |
| 2,889,602 | A * | 6/1959 | Maniaci | H02G 3/02 248/68.1 |

(Continued)

*Primary Examiner* — Ingrid M Weinhold
(74) *Attorney, Agent, or Firm* — Asgaard Patent Services, LLC; F. Wayne Thompson, Jr.

(57) ABSTRACT

Disclosed are implementations of a cable management device. An example cable management device can be attached to the handguard of a firearm, and used to route an electrical cable (or wire) connecting a remote switch to a firearm accessory, such as a flashlight. An example cable management device comprises: a body portion that includes a cable guide channel configured to receive therein a portion of an electrical cable; an elongated threaded fastener that includes a countersunk head; and a pivot fastener. The body portion is configured so that the countersunk head of the elongated threaded fastener can capture the portion of the electrical cable positioned within the cable guide channel. In some implementations, the body portion includes two cable guide channels, each of which is configured to receive therein a portion of an electrical cable.

12 Claims, 7 Drawing Sheets

(56) References Cited

U.S. PATENT DOCUMENTS

| | | | | |
|---|---|---|---|---|
| 2,950,936 | A * | 8/1960 | Gunthel, Jr. | F16G 11/06 |
| | | | | 24/135 R |
| 2,968,018 | A * | 1/1961 | Hubbell | H01R 4/34 |
| | | | | 439/431 |
| 3,924,920 | A * | 12/1975 | Moscioni | H01R 4/44 |
| | | | | 439/792 |
| 4,727,224 | A * | 2/1988 | Kellett | H01R 4/42 |
| | | | | 24/135 R |
| 6,136,002 | A * | 10/2000 | Shih | A61B 17/7044 |
| | | | | 606/70 |
| 6,142,836 | A * | 11/2000 | Deckmann | H01R 12/515 |
| | | | | 439/83 |
| 6,263,922 | B1 * | 7/2001 | Kerner | F16L 3/237 |
| | | | | 24/523 |
| 6,725,524 | B2 * | 4/2004 | Lin | H02K 5/225 |
| | | | | 29/596 |
| 8,429,844 | B2 | 4/2013 | Dextraze et al. | |
| 8,850,735 | B2 | 10/2014 | Kenney | |
| 9,296,059 | B2 * | 3/2016 | Hobson | B23K 9/202 |
| 9,453,703 | B2 | 9/2016 | Michal et al. | |
| 9,742,350 | B2 * | 8/2017 | McPheeters | H01R 4/34 |
| 11,175,114 | B1 * | 11/2021 | Lee | F16L 3/02 |
| 11,732,839 | B2 * | 8/2023 | Atakan | F16B 2/22 |
| | | | | 248/229.16 |
| 2015/0280334 | A1 * | 10/2015 | McPheeters | H01R 4/34 |
| | | | | 439/573 |
| 2021/0307802 | A1 * | 10/2021 | Andersen | A61B 17/842 |

\* cited by examiner

# CABLE MANAGEMENT DEVICE

CROSS REFERENCE TO RELATED APPLICATION

This application claims the benefit of U.S. Provisional Application Ser. No. 63/191,209, filed on May 20, 2021, the entirety of which is incorporated herein by reference.

TECHNICAL FIELD

This disclosure relates to implementations of a cable management device that can be attached to a handguard of a firearm and provides a cable-routing feature.

BACKGROUND

Firearms, such as rifles and/or shotguns, are often equipped with electronic peripheral devices, such as flashlights, laser aiming modules, etc. Often, electronic peripheral devices are actuated using one or more remote switches attached to a handguard of a firearm. An example remote switch, also referred to as a control device, includes a pushbutton switch and at least one flexible cable having an electrical connector, such as a plug. These cables can become snagged or otherwise interfere with operation of the firearm and/or peripheral devices.

Accordingly, it can be seen that a need exists for the cable management devices disclosed herein. It is to the provision of a cable management device configured to address these needs, and others, that the present invention is primarily directed.

SUMMARY OF THE INVENTION

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed are implementations of a cable management device. An example cable management device can be attached to the handguard of a firearm, and used to route an electrical cable (or wire) connecting a remote switch to a firearm accessory, such as a flashlight.

An example cable management device comprises: a body portion that includes a cable guide channel configured to receive therein a portion of an electrical cable; an elongated threaded fastener that includes a conical head with a tapered inner face; and a pivot fastener threadedly engaged with the elongated threaded fastener. The body portion is configured so that the tapered inner face of the elongated threaded fastener can capture the portion of the electrical cable positioned within the cable guide channel. The pivot fastener, in conjunction with the elongated threaded fastener, is configured to secure the body portion to an engagement interface of a firearm.

Another example cable management device comprises: a body portion, an elongated threaded fastener that includes a conical head with a tapered inner face, and a pivot fastener threadedly engaged with the elongated threaded fastener. The body portion includes a through-hole and a cable guide channel. The through-hole includes a tapered inlet configured to receive the tapered inner face of the elongated threaded fastener. The cable guide channel is positioned adjacent the through-hole and configured to receive therein a portion of an electrical cable. The tapered inlet of the body portion includes a gap adjacent the cable guide channel. The tapered inner face of the elongated threaded fastener is configured to capture the portion of the electrical cable positioned within the cable guide channel. The pivot fastener, in conjunction with the elongated threaded fastener, is configured to secure the body portion to an engagement interface of a firearm.

In some implementations, a cable management device can be used to route a pair of electrical cables, each of which connect a remote switch to a firearm accessory.

Accordingly, yet another example cable management device comprises: a body portion that includes two cable guide channels, each cable guide channel is configured to receive therein a portion of a respective one of the pair of electrical cables; an elongated threaded fastener that includes a conical head with a tapered inner face; and a pivot fastener threadedly engaged with the elongated threaded fastener. The body portion is configured so that the tapered inner face of the elongated threaded fastener can capture the portion of the respective electrical cable positioned within each cable guide channel. The pivot fastener, in conjunction with the elongated threaded fastener, is configured to secure the bodyu portion to an engagement interface of a firearm.

Sill yet another example cable management device comprises: a body portion, an elongated threaded fastener that includes a conical head with a tapered inner face, and a pivot fastener threadedly engaged with the elongated threaded fastener. The body portion includes a through-hole and two cable guide channels. The through-hole includes a tapered inlet configured to receive the tapered inner face of the elongated threaded fastener. The cable guide channels are positioned adjacent to, and on opposite sides of, the through-hole. Each cable guide channel is configured to receive therein a portion of a respective one of the pair of electrical cables. The tapered inlet of the body portion includes a gap adjacent each cable guide channel. The tapered inner face of the elongated threaded fastener is configured to capture the portion of the respective electrical cable positioned within each cable guide channel. The pivot fastener, in conjunction with the elongated threaded fastener, is configured to secure the body portion to an engagement interface of a firearm.

BRIEF DESCRIPTION OF THE DRAWINGS

Like reference numerals refer to corresponding parts throughout the several views of the drawings.

DETAILED DESCRIPTION

Figure 1:
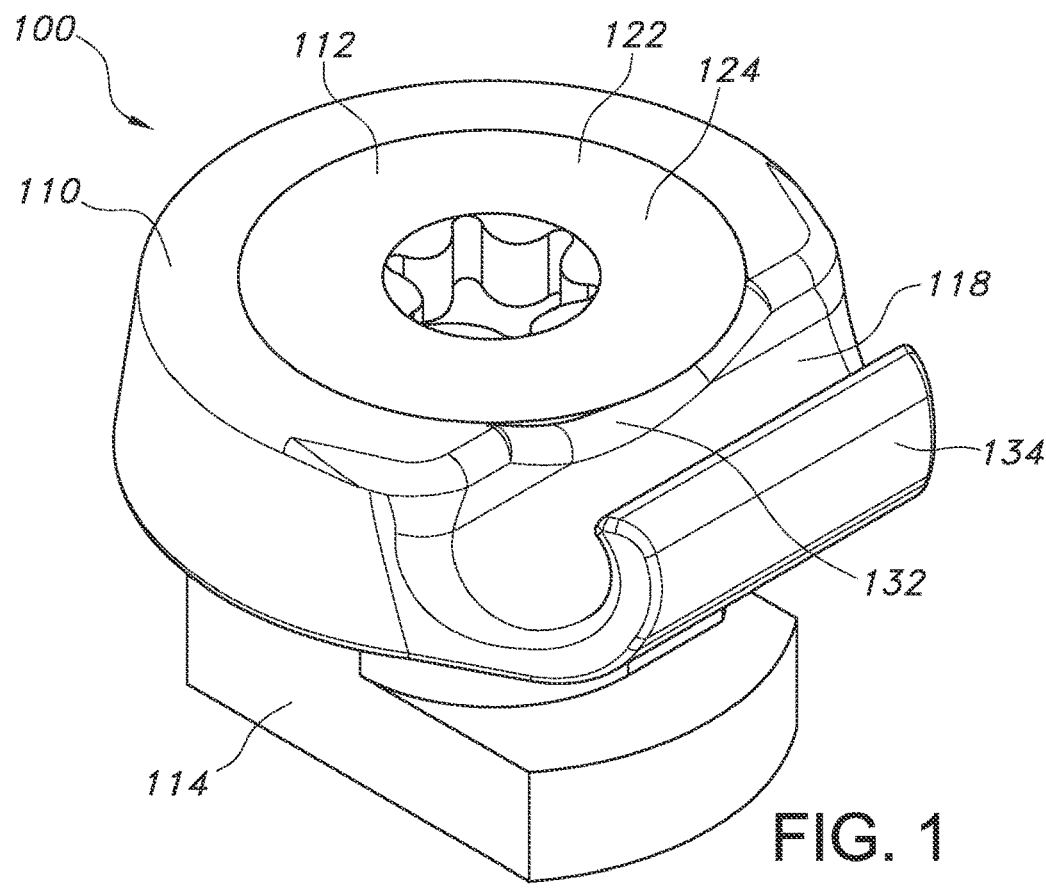
FIG. 1 illustrates an isometric view of an example cable management device according to the principles of the present disclosure.
Figure 2:
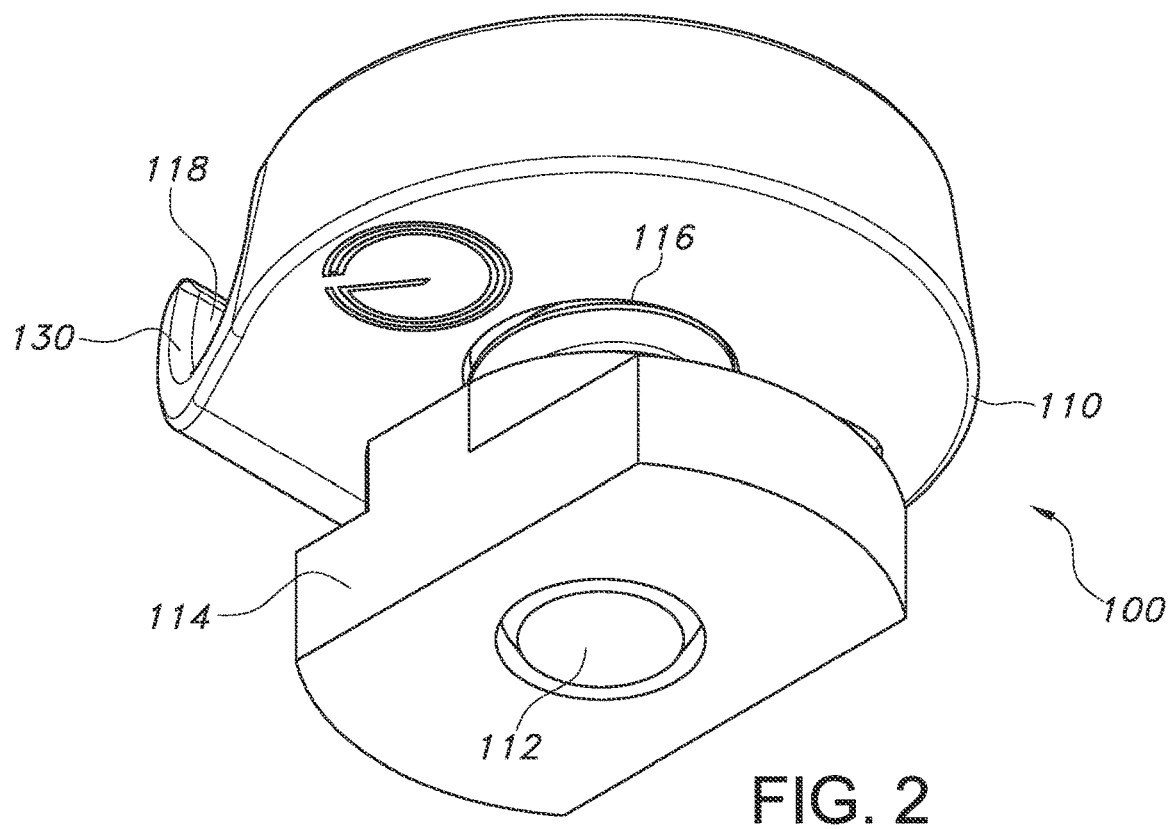
FIG. 2 illustrates another isometric view of the cable management device shown in FIG. 1.
Figure 3:
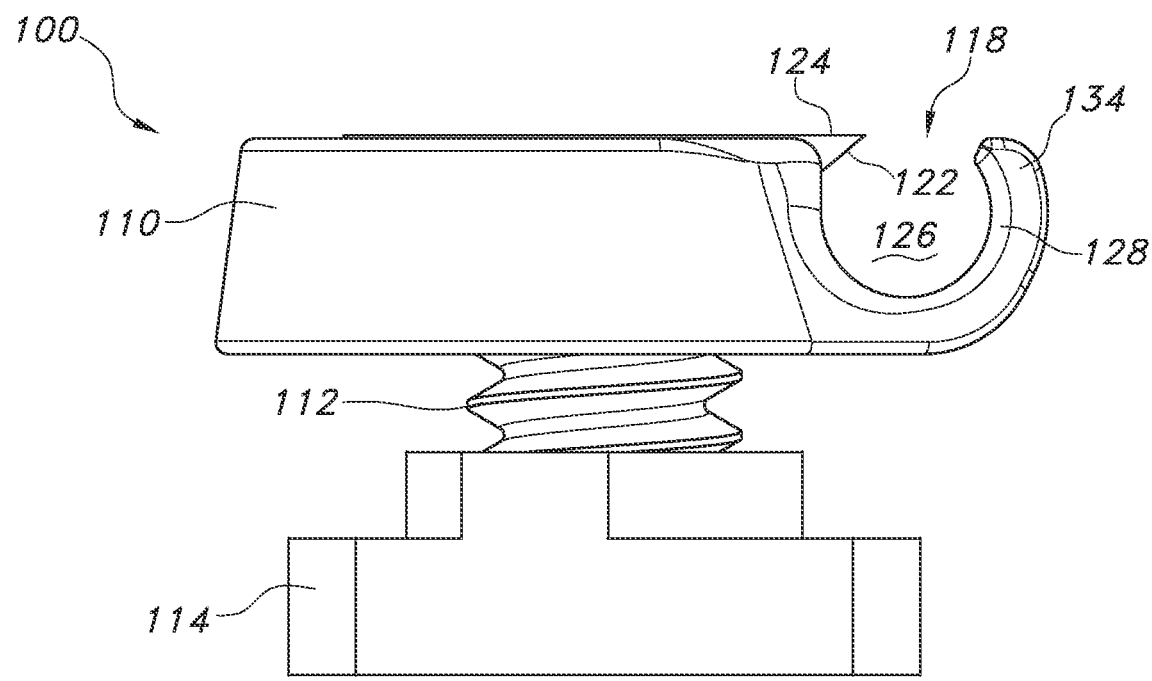
FIG. 3 illustrates a front side elevational view of the cable management device shown in FIG. 1.
Figure 4:
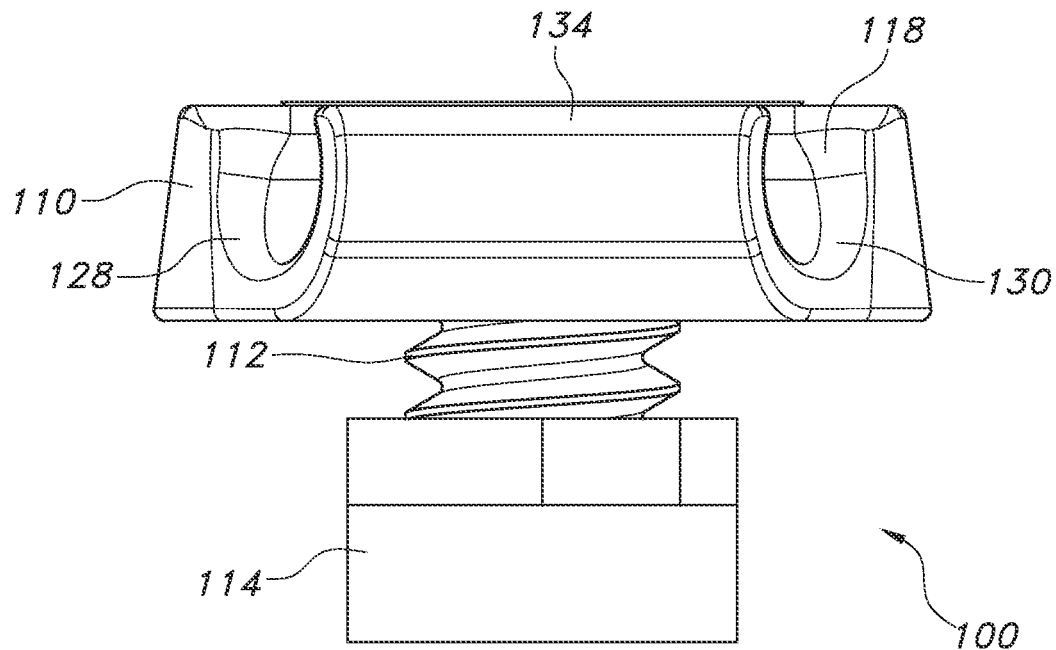
FIG. 4 illustrates a right side elevational view of the cable management device shown in FIG. 1.
Figure 5:
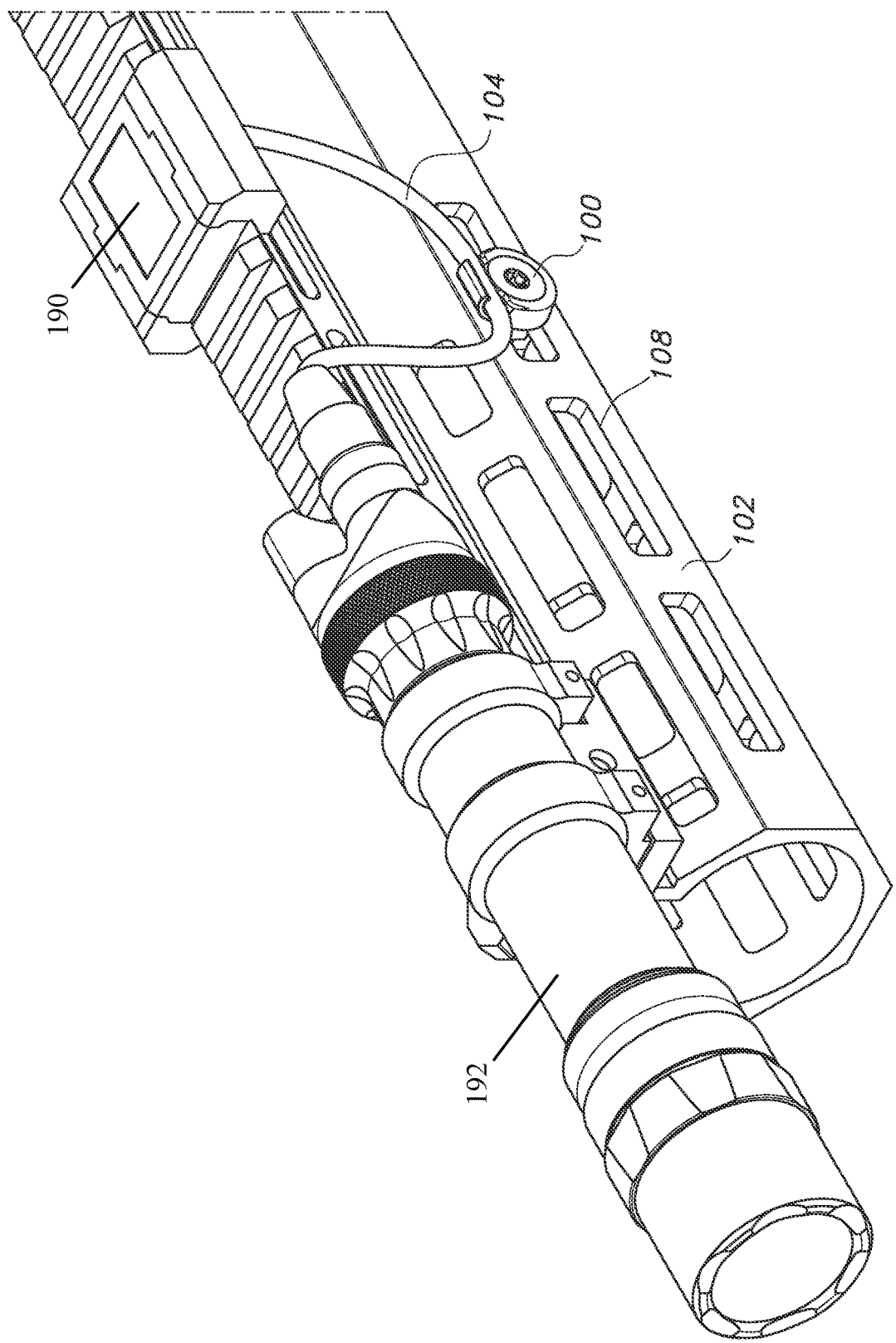
FIG. 5 illustrates a perspective view of the cable management device shown in FIG. 1 attached to a firearm handguard, and being used to route an electrical cable.

FIGS. 1-4 illustrate an example cable management device 100 according to the principles of the present disclosure. As shown in FIG. 5, the cable management device 100 can be attached to the handguard 102 of a firearm and is configured to organize, control, and route an electrical cable 104 (or wire) connecting a remote switch 190 to a firearm accessory, such as a flashlight 192.

As shown best in FIGS. 1-4, an example cable management device 100 comprises a body portion 110, an elongated threaded fastener 112 (e.g., a screw), and a pivot fastener 114 (e.g., a T-nut).

Figure 6:
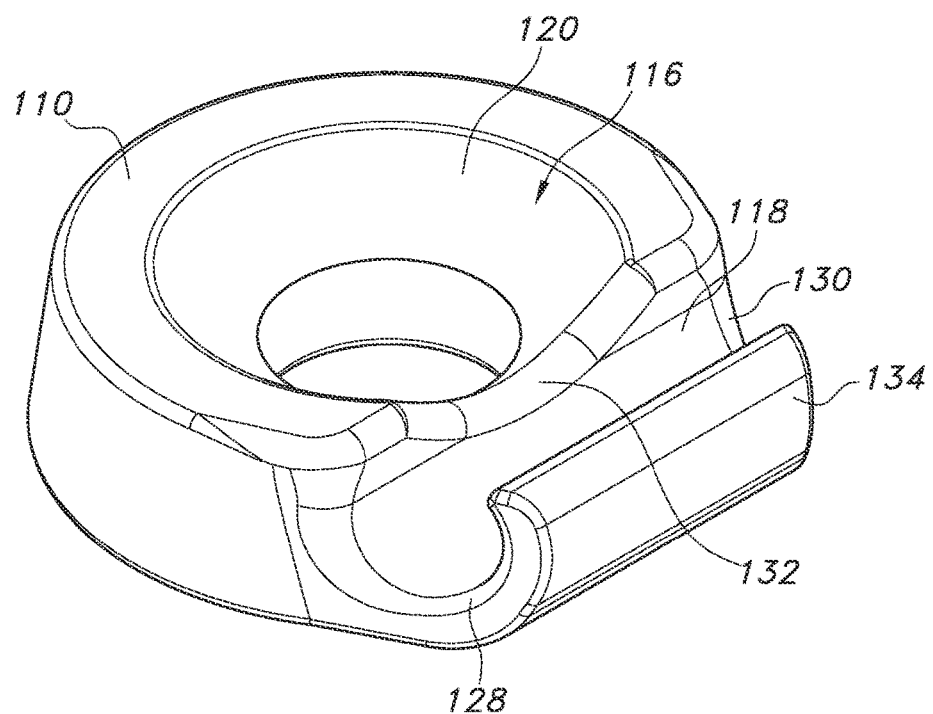
FIG. 6 illustrates an isometric view of the cable management device shown in FIG. 1, wherein the elongated threaded fastener and pivot fastener have been removed.

As shown best in FIG. 6, the body portion 110 of the cable management device 100 includes a through-hole 116 and a cable guide channel 118. The through-hole 116 includes a tapered inlet 120 configured to receive the countersunk head 122 of the elongated threaded fastener 112. The tapered inlet 120 of the through-hole 116 has a countersink angle of ~100 degrees, though in some implementation it could be 82 degrees, 90 degrees, or another countersink angle suitable for receiving the countersunk head of an elongated threaded fastener. The cable guide channel 118 is positioned adjacent the through-hole 116 and configured to receive therein a portion of the electrical cable 104. The cable guide channel 118 is a groove that defines an arc-shaped recess 126 having a width greater than or equal to the diameter of the electrical cable 104. The first end 128 and the second end 130 of the cable guide channel 118 are rounded, thereby providing a suitable surface over which the electrical cable 104 can be bent while routed to another cable management device 100 or a firearm accessory, such as a flashlight or laser aiming module. The body portion 110 also includes a gap 132 in the surface of the tapered inlet 120 adjacent the cable guide channel 118. In this way, when the countersunk head 122 of the elongated threaded fastener 112 is seated within the tapered inlet 120, the countersunk head 122 captures the portion of the electrical cable 104 positioned within the cable guide channel 118 (see, e.g., FIG. 5).

The body portion 110 of the cable management device 100 can be 3D printed or injection molded. The body portion 110 is made of nylon, though other suitable plastics could be used. The use of a resilient material, such as nylon, allows the arm 134 of the cable guide channel 118 to flex and thereby resiliently engage the electrical cable 104 positioned within the cable guide channel 118.

Figures 7, 8:
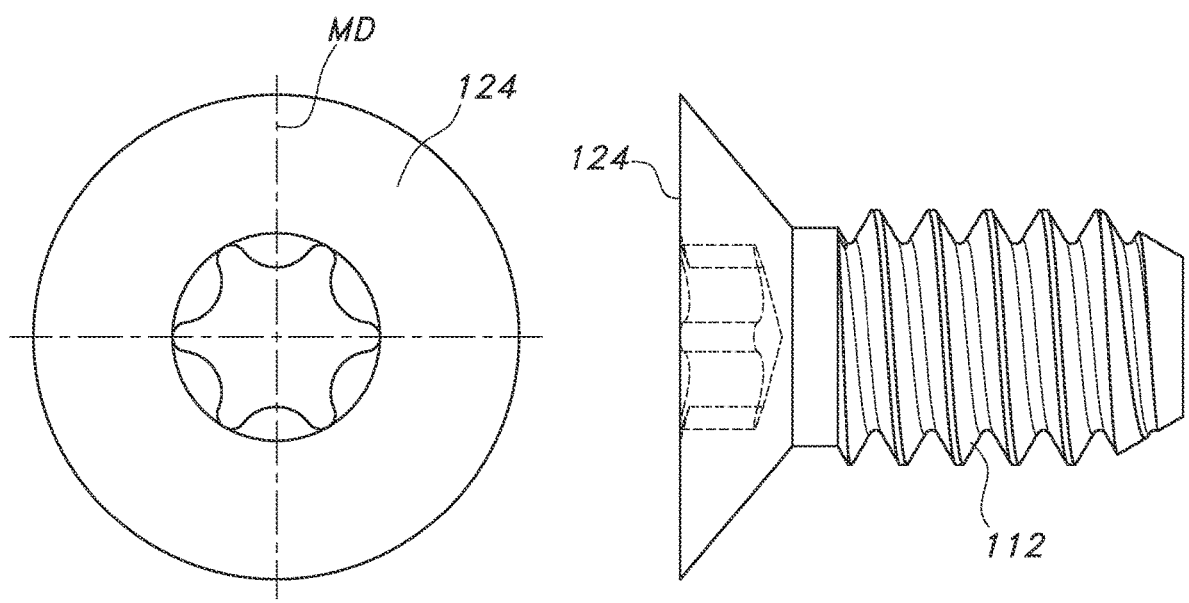
FIG. 7 illustrates a side elevational view of an elongated threaded fastener.
FIG. 8 illustrates a top plan view of the elongated threaded fastener shown in FIG. 7.
Figure 9:
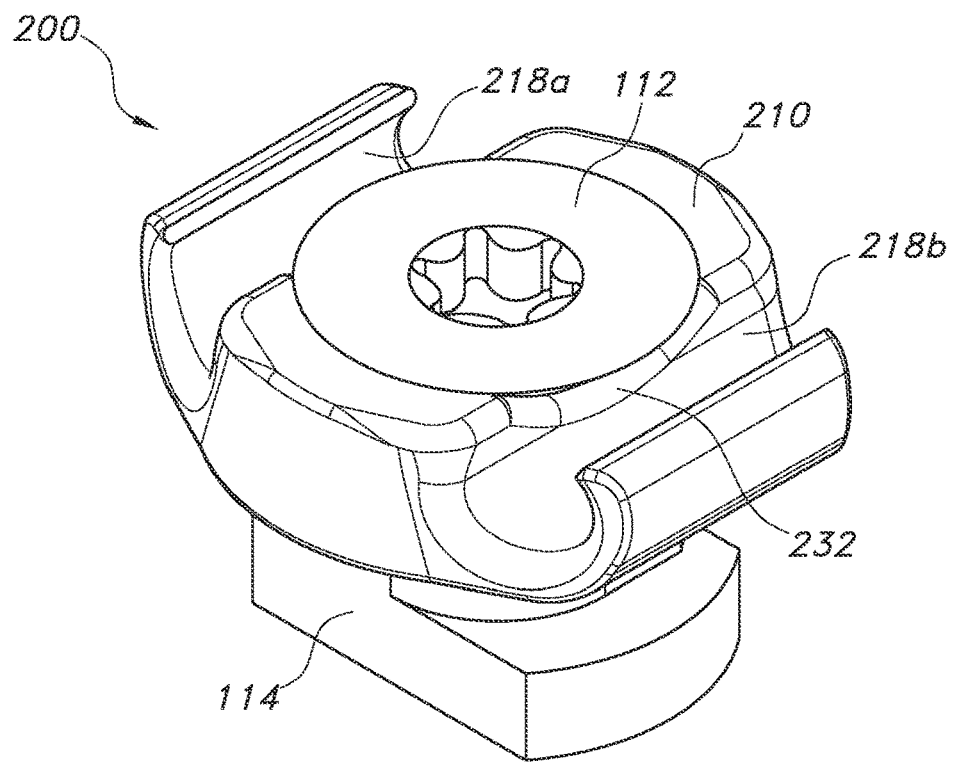
FIG. 9 illustrates an isometric view of another example cable management device according to the principles of the present disclosure.
Figure 10:
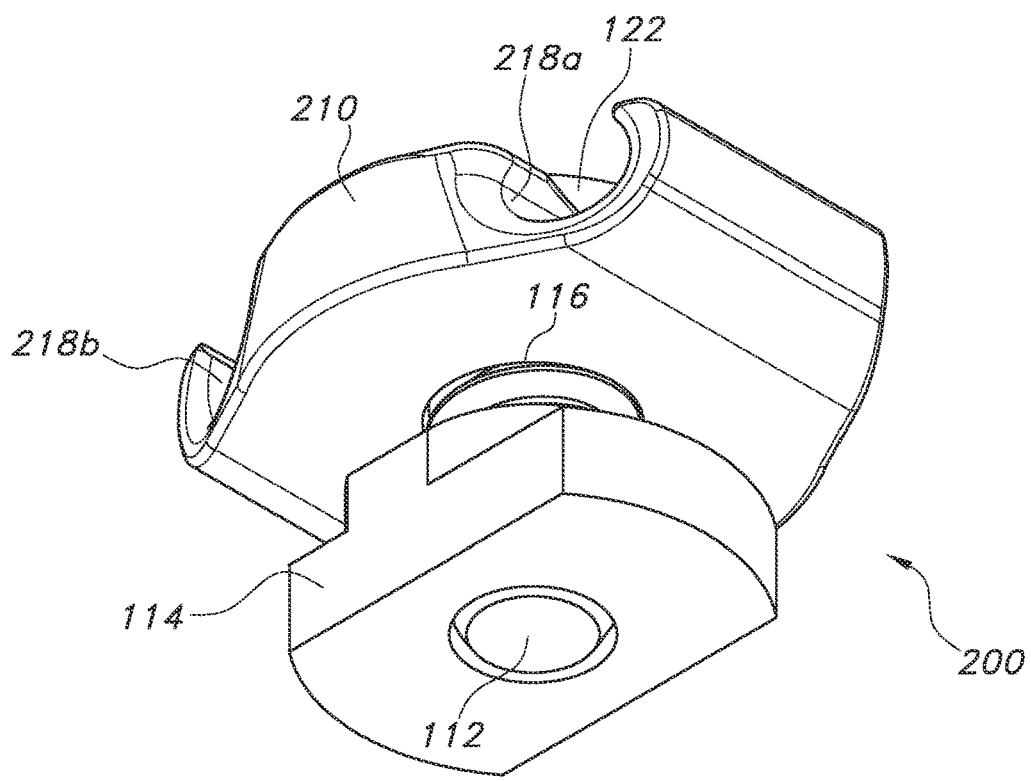
FIG. 10 illustrates another isometric view of the cable management device shown in FIG. 9.
Figure 11:
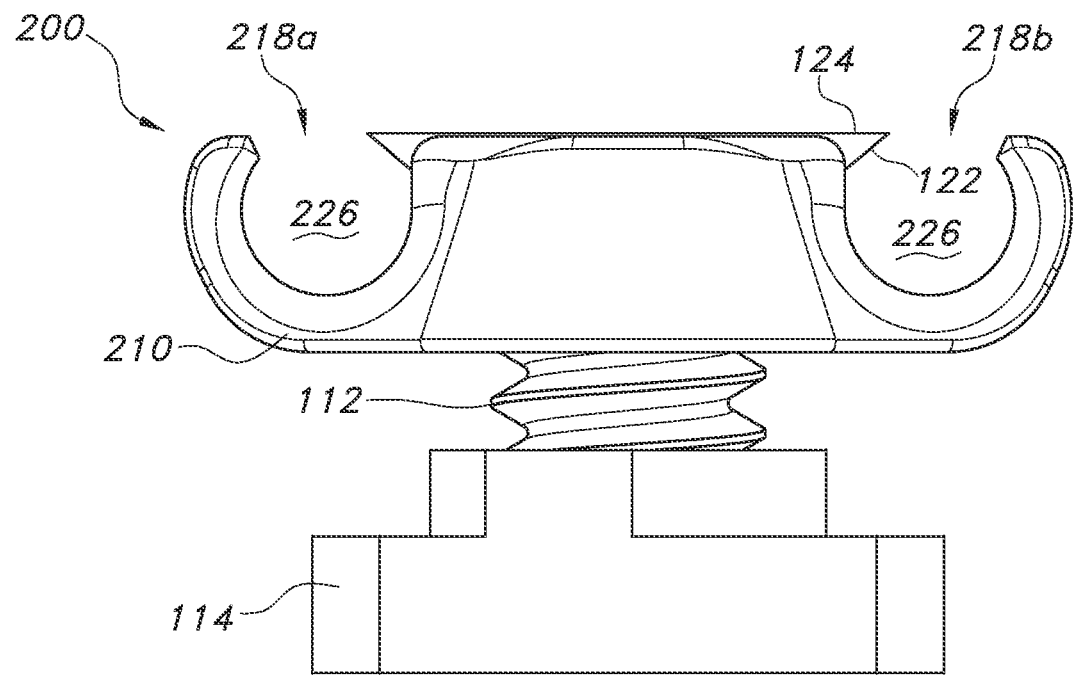
FIG. 11 illustrates a front side elevational view of the cable management device shown in FIG. 9.
Figure 12:
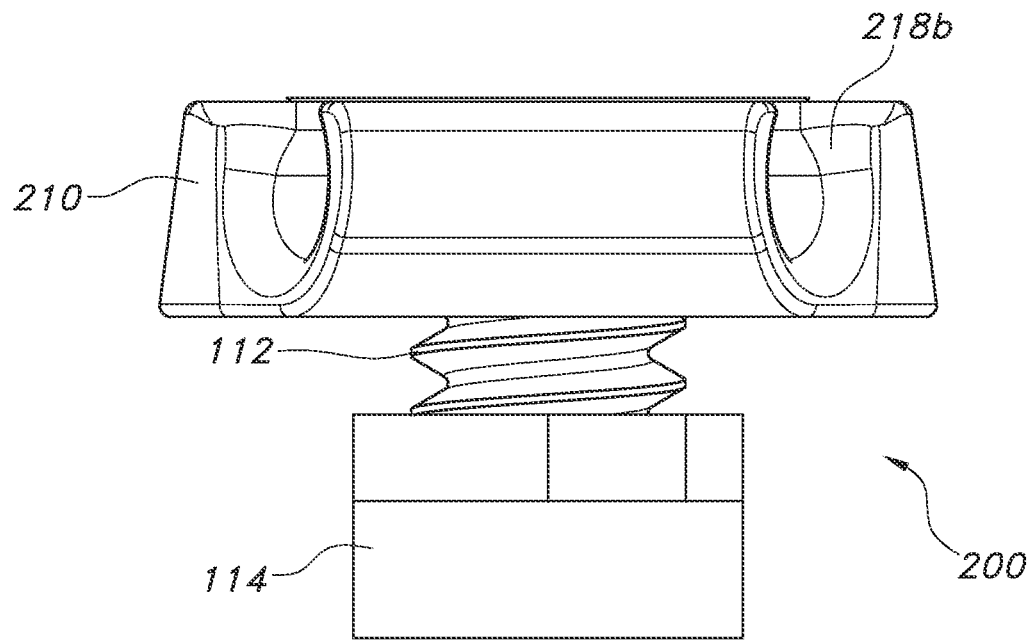
FIG. 12 illustrates a right side elevational view of the cable management device shown in FIG. 9.

As shown best in FIGS. 7 and 8, the elongated threaded fastener 112 of the cable management device 100 is a screw having a countersunk head 122. The countersunk head 122 has an angle of ~100 degrees, the major diameter MD of the countersunk head 122 captures the portion of an electrical cable 104 positioned within the cable guide channel 118. However, in some implementations, the countersunk head 122 may have a countersink angle of 82 degrees, 90 degrees, or another countersink angle that results in a flat outer face 124 having a major diameter MD sufficient to capture an electrical cable 104 positioned within the cable guide channel 118 of the cable management device 100.

The pivot fastener 114 of the cable management device 100 is a M-Lok compatible T-nut, well known to those of ordinary skill in the art.

Together, the elongated threaded fastener 112 and pivot fastener 114 are used to secure the cable management device 100 to an M-Lok engagement interface 106. The elongated threaded fastener 112 is inserted through the through-hole 116 of the body portion 110 and threaded through at least a portion of the pivot fastener 114.

The following steps can be used to attach a cable management device 100 to an M-Lok engagement interface 106 and to route an electrical cable 104 using the cable management device 100.

Initially, position the cable management device 100 on an M-Lok engagement interface 106 so the pivot fastener 114 extends through an elongated slot 108 of the M-Lok engagement interface 106. Then, prior to securing the body portion 110 to the M-Lok engagement interface 106, rotate the body portion 110 about the elongated threaded fastener 112 to an orientation that positions the cable guide channel 118 in a desired orientation. Next, place a portion of the electrical cable 104 within the cable guide channel 118. Then, tighten the elongated threaded fastener 112, thereby capturing the electrical cable 104 within the cable guide channel 118 and causing the pivot fastener 114 to rotate and secure the cable management device 100 to the M-Lok engagement interface 106. One of ordinary skill in the art would know how to use a screw 112 and an M-Lok compatible T-nut 114 to secure the body portion 110 to an M-Lok engagement interface 106.

It should be noted that, while captured by the countersunk head 122 of the elongated threaded fastener 112 within the cable guide channel 118, a sufficient force applied to the electrical cable 104 will cause the arm 134 of the cable guide channel 118 to flex outwardly, thereby freeing the electrical cable 104 from the cable guide channel 118. In this way, the electrical cable 104 is released by the cable management device 100 without damage.

FIGS. 9-12 illustrate another example cable management device 200 in accordance with the present disclosure. The cable management device 200 is similar to the cable management device 100 discussed above, but the body portion 210 of the cable management device 200 includes two cable guide channels 218a, 218b.

Figure 13:
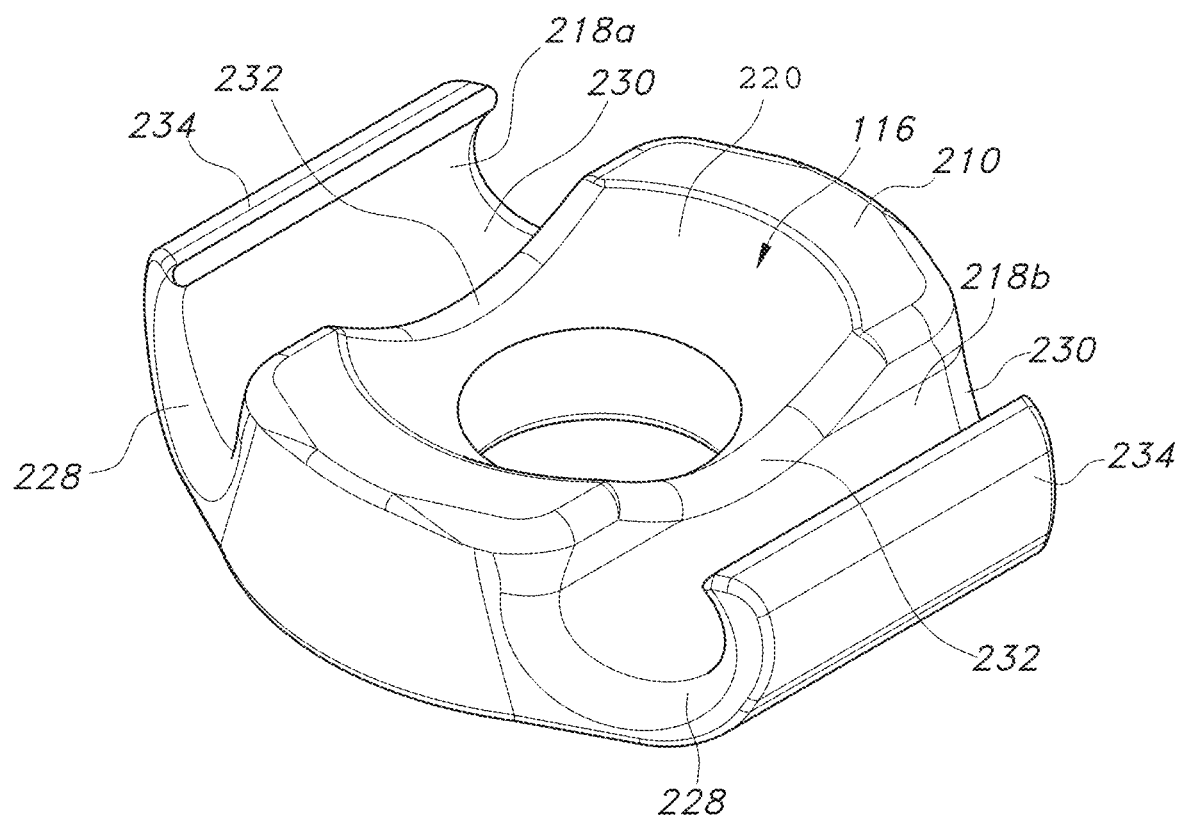
FIG. 13 illustrates an isometric view of the cable management device shown in FIG. 9, wherein the elongated threaded fastener and pivot fastener have been removed.

As shown best in FIG. 13, the body portion 210 of the cable management device includes a through-hole 116 and two cable guide channels 218a, 218b. The cable guide channels 218, 218b are positioned adjacent to, and on opposite sides of, the through-hole 116. Each cable guide channel 218a, 218b is a groove that defines an arc-shaped recess 226 having a width greater than or equal to the diameter of the electrical cable 104. The first end 228 and the second end 230 of each cable guide channel 218a, 218b are rounded, thereby providing a suitable surface over which the electrical cable 104 can be bent while routed to another cable management device (100, 200) or a firearm accessory, such as a flashlight or laser aiming module. The body portion 210 also includes a gap 232 in the surface of the tapered inlet 220 adjacent each cable guide channel 218a, 218b. In this way, when the countersunk head 122 of the elongated threaded fastener 112 is seated within the tapered inlet 220, the countersunk head 122 captures the portion of the electrical cable 104 positioned within each cable guide channel 218a, 218b.

The body portion 210 of the cable management device 200 can be 3D printed or injection molded. The body portion 210 is made of nylon, though other suitable plastics could be used. The use of a resilient material, such as nylon, allows the arm 234 of each cable guide channel 218a, 218b to flex and thereby resiliently engage the electrical cable 104 positioned therein.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A cable management device used to route an electrical cable, the cable management device comprising:
    a body portion that includes a cable guide channel configured to receive therein a portion of the electrical cable;
    an elongated threaded fastener that includes a conical head with a tapered inner face; and
    a pivot fastener threadedly engaged with the elongated threaded fastener;
    wherein:
    the body portion is configured so that the tapered inner face of the elongated threaded fastener can capture the portion of the electrical cable positioned within the cable guide channel; and
    the pivot fastener, in conjunction with the elongated threaded fastener, is configured to secure the body portion to an engagement interface of a firearm.

2. The cable management device of claim 1, wherein the cable guide channel is a groove that defines an arc-shaped recess, a first end and a second end of the groove are rounded.

3. A cable management device used to route an electrical cable, the cable management device comprising:
    a body portion;
    an elongated threaded fastener that includes a conical head with a tapered inner face; and
    a pivot fastener threadedly engaged with the elongated threaded fastener;
    wherein:
    the body portion includes a through-hole and a cable guide channel, the through-hole includes a tapered inlet configured to receive the tapered inner face of the elongated threaded fastener, the cable guide channel is positioned adjacent the through-hole and configured to receive therein a portion of the electrical cable, the tapered inlet of the body portion includes a gap adjacent the cable guide channel;
    the tapered inner face of the elongated threaded fastener is configured to capture the portion of the electrical cable positioned within the cable guide channel; and
    the pivot fastener, in conjunction with the elongated threaded fastener, is configured to secure the body portion to an engagement interface of a firearm.

4. The cable management device of claim 3, wherein the cable guide channel is a groove that defines an arc-shaped recess, a first end and a second end of the groove are rounded.

5. A cable management device used to route a pair of electrical cables, the cable management device comprising:
    a body portion that includes two cable guide channels, each cable guide channel is configured to receive therein a portion of a respective one of the pair of electrical cables;
    an elongated threaded fastener that includes a conical head with a tapered inner face; and
    a pivot fastener threadedly engaged with the elongated threaded fastener;
    wherein:
    the body portion is configured so that the tapered inner face of the elongated threaded fastener can capture the portion of the respective electrical cable positioned within each cable guide channel; and
    the pivot fastener, in conjunction with the elongated threaded fastener, is configured to secure the body portion to an engagement interface of a firearm.

6. The cable management device of claim 5, wherein each cable guide channel is a groove that defines an arc-shaped recess, a first end and a second end of the groove are rounded.

7. A cable management device used to route a pair of electrical cables, the cable management device comprising:
    a body portion;
    an elongated threaded fastener that includes a conical head with a tapered inner face; and
    a pivot fastener threadedly engaged with the elongated threaded fastener;
    wherein:
    the body portion includes a through-hole and two cable guide channels, the through-hole includes a tapered inlet configured to receive the tapered inner face of the elongated threaded fastener, the cable guide channels are positioned adjacent to, and on opposite sides of, the through-hole, each cable guide channel is configured to receive therein a portion of a respective one of the pair of electrical cables, the tapered inlet of the body portion includes a gap adjacent each cable guide channel;
    the tapered inner face of the elongated threaded fastener is configured to capture the portion of the respective electrical cable positioned within each cable guide channel; and
    the pivot fastener, in conjunction with the elongated threaded fastener, is configured to secure the body portion to an engagement interface of a firearm.

8. The cable management device of claim 7, wherein each cable guide channel is a groove that defines an arc-shaped recess, a first end and a second end of the groove are rounded.

9. The cable management device of claim 1, wherein the pivot fastener is a T-nut.

10. The cable management device of claim 3, wherein the pivot fastener is a T-nut.

11. The cable management device of claim 5, wherein the pivot fastener is a T-nut.

12. The cable management device of claim 7, wherein the pivot fastener is a T-nut.

* * * * *